US011537559B2

(12) United States Patent
Panchapakesan

(10) Patent No.: US 11,537,559 B2
(45) Date of Patent: Dec. 27, 2022

(54) CLIENT GENERATED AGGREGATED INDICES

(71) Applicant: AIRWATCH LLC, Atlanta, GA (US)

(72) Inventor: Ramani Panchapakesan, Bangalore (IN)

(73) Assignee: AIRWATCH LLC, Atlanta, GA (US)

(*) Notice: Subject to any disclaimer, the term of this patent is extended or adjusted under 35 U.S.C. 154(b) by 1129 days.

(21) Appl. No.: 14/687,975

(22) Filed: Apr. 16, 2015

(65) Prior Publication Data

US 2016/0188618 A1 Jun. 30, 2016

(30) Foreign Application Priority Data

Dec. 30, 2014 (IN) .......................... 6749/CHE/2014

(51) Int. Cl.
*G06F 16/13* (2019.01)
*H04L 67/1097* (2022.01)
*H04L 67/125* (2022.01)

(52) U.S. Cl.
CPC ........ *G06F 16/134* (2019.01); *H04L 67/1097* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 2008/0294674 A1* | 11/2008 | Reztlaff, II | G06F 17/30613 |
| 2008/0306978 A1* | 12/2008 | Hoernkvist | G06F 17/30321 |
| 2010/0191865 A1* | 7/2010 | Wang | H04L 12/40013 709/250 |
| 2011/0004678 A1* | 1/2011 | Rothrock | G06F 8/65 709/223 |
| 2011/0093957 A1* | 4/2011 | Ciano | G06F 21/64 726/26 |
| 2012/0131102 A1* | 5/2012 | Gabos | H04N 1/00153 709/204 |
| 2012/0143873 A1* | 6/2012 | Saadat | G06F 17/30321 707/741 |
| 2014/0046898 A1* | 2/2014 | Smith | G06F 17/303 707/609 |
| 2014/0279887 A1* | 9/2014 | Tomono | G06F 17/30094 707/625 |
| 2014/0331086 A1* | 11/2014 | Resch | G06F 11/1458 714/15 |
| 2015/0012632 A1* | 1/2015 | Faitelson | G06F 17/30312 709/223 |
| 2015/0134562 A1* | 5/2015 | Rajapakse | G06Q 10/00 705/342 |
| 2015/0207903 A1* | 7/2015 | Tulino | H04L 67/1097 370/229 |
| 2015/0323956 A1* | 11/2015 | Goyal | G06F 1/04 713/600 |

* cited by examiner

*Primary Examiner* — Ashish Thomas
*Assistant Examiner* — Dustin D Eyers
(74) *Attorney, Agent, or Firm* — Thomas Horstemeyer, LLP

(57) ABSTRACT

Disclosed are various embodiments for generating an index. A computing device provides a location of a requested file to a client device in response to receiving a search query of a master index from the client device. The computing device updates the master index with index data associated with the requested file, wherein the index data associated with the requested file is received from the client device.

20 Claims, 4 Drawing Sheets

CLIENT GENERATED AGGREGATED INDICES

Benefit is claimed under 35 U.S.C. 119(a)-(d) to Foreign application Serial No. 6749/CHE/2014 filed in India entitled "CLIENT GENERATED AGGREGATED INDICES", on Dec. 30, 2014, by AIRWATCH LLC, which is herein incorporated in its entirety by reference for all purposes.

BACKGROUND

Files may be stored in multiple locations, such as on client devices, remote computing devices, in file systems, in databases, and/or other locations. Computing devices may use searchable indices to identify relevant files and determine their location.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for generating a searchable index by aggregating index data generated by multiple client, devices (e.g., smartphones, tablets, or other computing devices) in response to the multiple client devices downloading individual files. A searchable master index may contain records for files, wherein the records reflect file metadata. A client device downloads a file for use on the client device. After downloading the file, the client device indexes the content of the file. The indexed content data is then added to a master index by the client device, allowing other client devices to search the content of the newly indexed file in addition to the metadata for the file. In some embodiments, files that are likely to have their copy remain unindexed for a prolonged period of time may be assigned to individual client devices. The content of the assigned files may be subsequently indexed by the client devices and the master index may be updated with the indexed content of these files. In the following discussion, a general description of the system and its components is provided, followed by a discussion of the operation of the same.

Figure 1A:
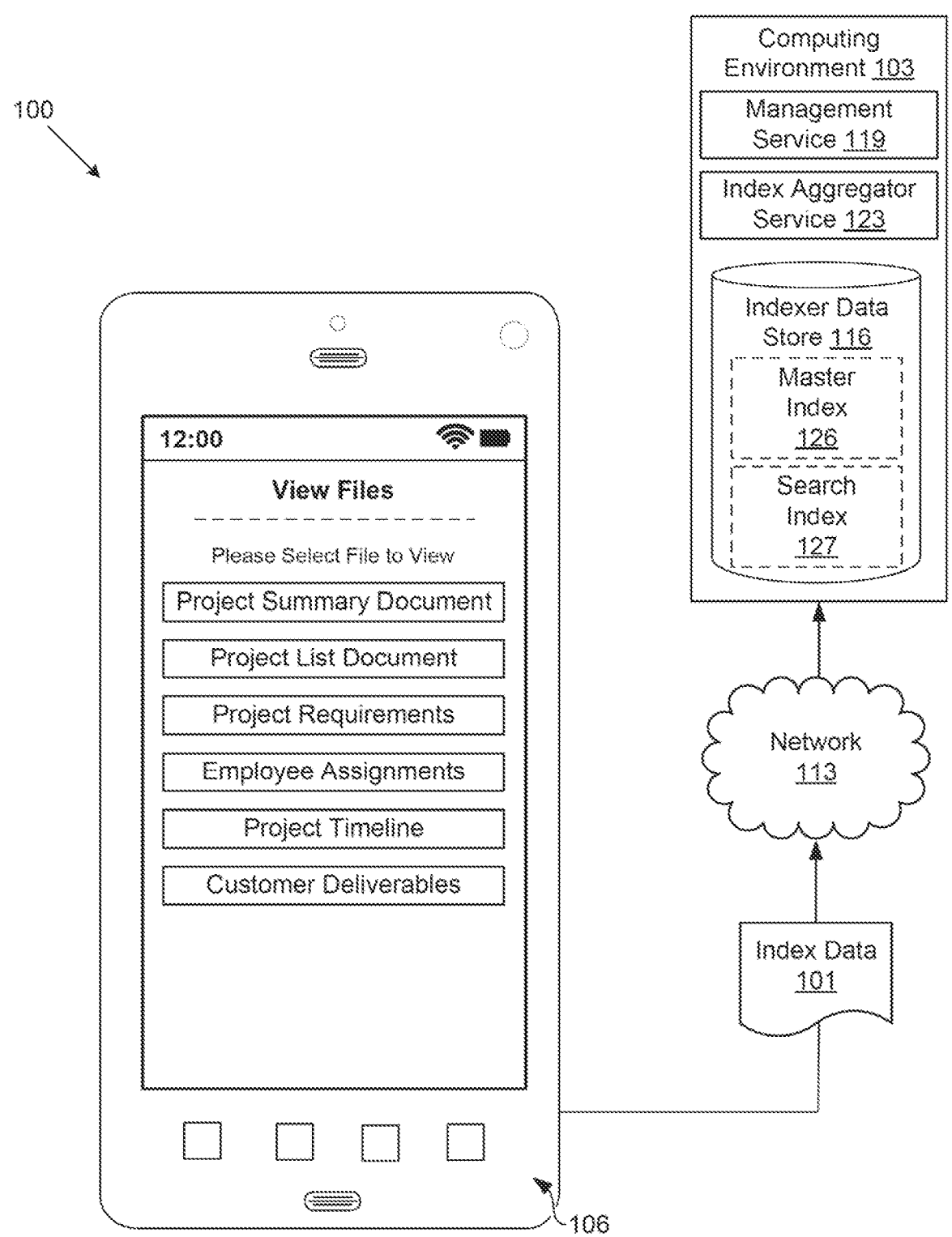
FIG. 1A is a drawing depicting the operation of various embodiments of the disclosure in a networked environment.

With reference to FIG. 1A, shown is an illustrative and non-limiting example of various embodiments of the present disclosure operating within a networked environment 100. Index data 101 is transmitted to computing environment 103 from a client device 106 in data communication with the computing environment 103 over the network 113 for storage in the indexer data store 116. The index data 101 may correspond to the indexed content of one or more files that have been retrieved by the client device 106 from a cement repository specified by the management service 119. This may allow for an index aggregator service 123 to generate, a searchable master index 126 and/or search index 127 of files without the computing environment 103 and/or the index aggregator service 123 having access to actual files or content of the files.

Figure 1B:
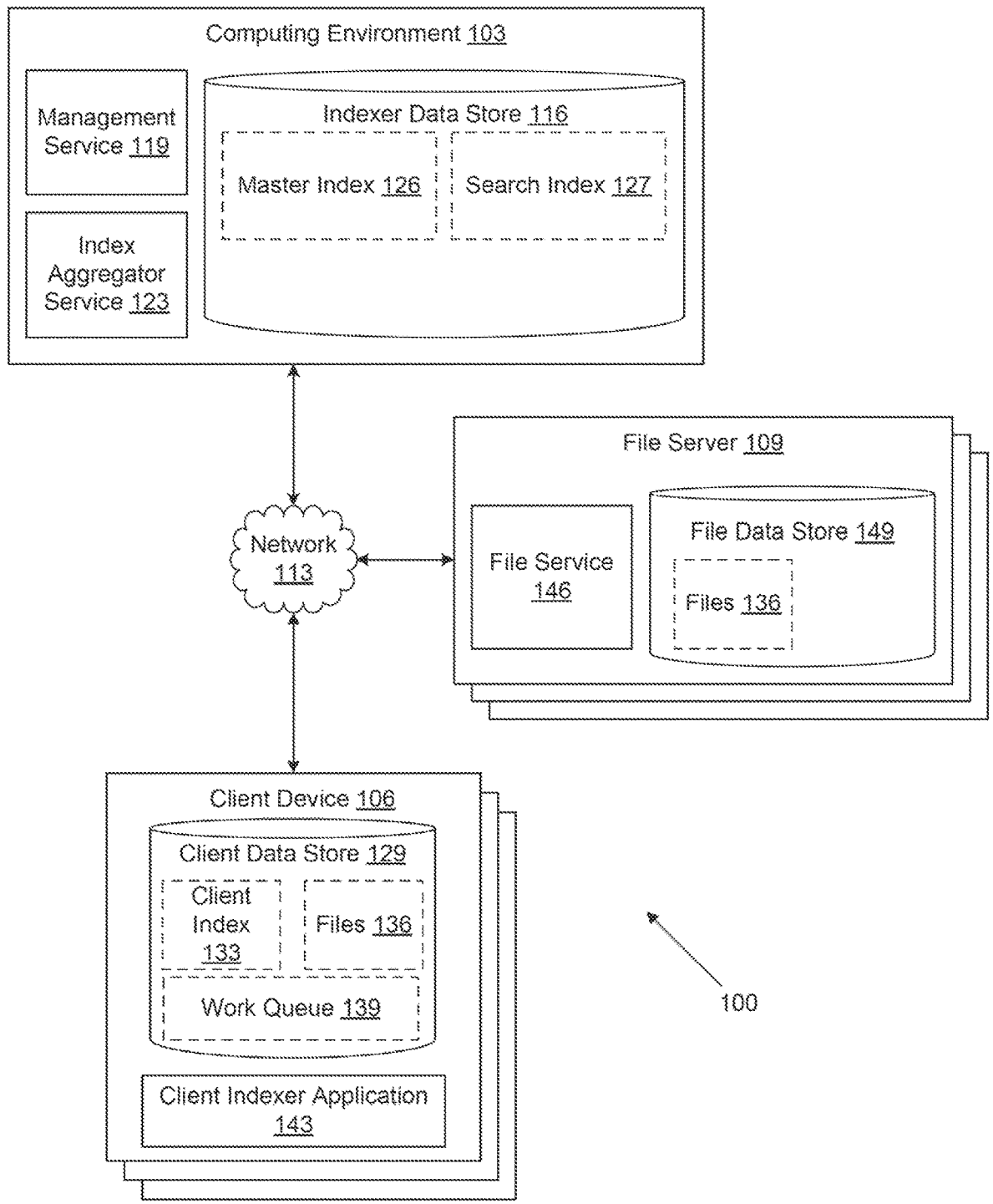
FIG. 1B is a schematic block diagram of the networked environment according to various embodiments of the present disclosure.

With reference to FIG. 1B, shown is the networked environment 100 according to various embodiments. The networked environment 100 includes a computing environment 103, a client device 106, and one or more file servers 109, which are in data communication with each other over a network 113. The network 113 includes the Internet, intranets, extranets, wide area networks (WANs), local area networks (LANs), wired networks, wireless networks, or other suitable networks, etc., or any combination of two or more such networks. Such networks may comprise satellite networks, cable networks, Ethernet networks, and other types of networks.

The computing environment 103 may comprise a server computer or any other system providing computing capability. Alternatively, the computing environment 103 may employ a plurality of computing devices that may be arranged in one or more server banks or computer banks or other arrangements. Such computing devices may be located in a single installation or may be distributed among many different geographical locations. The computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in an indexer data store 116 that is accessible to the computing environment 103. The indexer data store 116 may be representative of a plurality of indexer data stores 116 as can be appreciated. The data stored in the indexer data store 116 may be associated with the operation of the various applications and/or functional entities described below.

The components executed on the computing environment 103 include a management service 119, an index aggregator service 123, and other applications, services, processes, systems, engines, or functionality not discussed in detail herein. The management service 119 may securely provide access to content to client devices 106. For example, the management service 119 may determine whether a client device 106 or a use of the client device 106 is allowed to access content located, on one or more file servers 109 in receiving a request from the client device 106 for the content. If the client device 106 or user is authorized to access the content, then the management service 119 may provide a link, address, or similar location identifier of the requested content to the client device 106. The index aggregator service 123 may generate the master index 126 and/or search index 127 for content that is accessed and/or accessible through the management service 119.

The data stored in the indexer data store 116 includes a master index 126, a search index 127, and potentially other data. The master index 126 may represent a searchable index of content accessed through the management service 119. The master index 126 may store an index of metadata associated with content accessed or accessible through the management service 119. The search index 127 may represent a searchable index of content accessed through the management service 119. The search index 127 may store an index of search terms, keywords, and/or other data associated with content accessed or accessible through the management service 119, in some embodiments, the contents and functionality of the master index 126 and the search index 127 may be provided by a single index.

The client device 106 is representative of one or more client devices 106 that may be coupled to the network 113. The client device 106 may comprise a processor-based system, such as a computer system. Such a computer system may be embodied in the form of a desktop computer, a laptop computer, personal digital assistants, cellular telephones, smartphones, set-top boxes, music players, web pads, tablet computer systems, game consoles, electronic, book readers, or other devices with like capability. The client device 106 may include a display. The display may comprise one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may also include a client data store 129. Data stored in the client data store 129 may include a client index 133, one or more flies 136, and/or a work queue 139. The client data store 129 may be representative of one or more data stores of the client device 106. The client data store 129 may also include other data.

The client index 133 represents a searchable local index of the files 136 locally stored in the client data store 129 on the client device 106. The client index 133 may be generated by the client device 106, as will be further described herein. The client index 133 may also be based upon a copy of the master index 126 and/or search index 127 as well as portions of the master index 126 and/or search index 127 previously downloaded from the computing, environment 103. The client index 133 may, in some embodiments, represent portions of the master index 126 and/or search index 127 that are associated with files 136 that a user of the client device 106 is authorized to access and additional index data generated by the client device 106 of the files 136 stored in the client data store 129.

The files 136 represent content that has been previously requested by the client device 106 from the management service 119. These files 136 may correspond to any one or more files or content, such as text files, document files, audio files, video files, email messages, and/or other content or files. A file 136 may include metadata associated with the file. The metadata may include data that describes the file 136, such as the name of the file 136, the location of the file 136, the type of file 136 (e.g. PDF, JPEG, etc.), the date the file 136 was created, the user account used to create the file 136, the date the file 136 was last accessed, the user account corresponding to the last access of the file 136, the date the file 136 was last modified, the user account corresponding to the last modification of the file 136, and/or other metadata.

The work queue 139 represents a queue or similar data structure for tracking one or more files 136 which the client device 106 will index the content of at some point in the future. Files 136 which have not had their content indexed may be added to the work queue 139 by the client indexer application 143 for later indexing. In some embodiments, the client indexer application 143 may add the file 136 at the request of the index aggregator service 123, such as when the content of a file 136 has not been indexed within a predefined period of time or at all.

The client device 106 may be configured to execute various applications such as as client indexer application 143 and/or other applications. The client device 106 may be configured to execute applications beyond the client indexer application 143 such as email applications, social networking applications, word processors, spreadsheets, and/or other applications.

The client indexer application 143 may generate portions of the client index 133 by indexing the content of files 136 stored in the client data store 129. In some embodiments, the client indexer application 143 may communicate with the index aggregator service 123 to update the master index 126 and/or search index 127 with index data of the content of the files 136 located in the client data store 129. In some embodiments, the client indexer application 143 may also add files 136 to the work queue 139 for indexing at the request of the index aggregator service 123, as will be further described herein. In various embodiments, the client indexer application 143 may be executed as a component, thread, and/or subprocess of another application executing on the client device 106. For example, the client indexer application 143 may be a component and/or subprocess of a client application that allows a user of the client device 106 to access particular content or flies 136 specified by the management service 119. The file server 109 is representative of one or more file servers 109 that may be coupled to the network 113. As such, the file server 109 may be representative of a content repository or a component of a distributed or redundant content repository. In some embodiments, the file server 109 may be a component of the computing environment 103. In various embodiments, the file server 109 may be separate from the computing environment 103. The file server 109 may be configured to execute a file service 146 and include a file data store 149. The data stored in the file data store 149 may include one or more files 136. The file service 146 may be configured to provide files 136 to cheat device 106 and/or other computing devices.

Next, a general description of the operation of the various components of the networked environment 100 is provided. To begin, the index aggregator service 123 identifies all files 136 in file data stores 149 that are accessible by at least one client device 106 through the management service 119. The index aggregator service 123 may identify all file data stores 149 and/or file services 146 previously registered in conjunction with at least one user account for the management service 119.

The index aggregator service 123 then generates an initial master index 126. To generate the initial master index 126, the index aggregator service 123 may index the metadata associated with each file 136 stored in a file data store 149. The index aggregator service 123 may generate searchable records in the master index 126 that allows user to search for individual files based on the name of a file 136, the date the file 136 was modified, the creator of the file 136, and/or other metadata describing the files 136. In various embodiments, the client device 106 may download a copy of the master index 126 to the client data store 129 to create an initial, copy of the client index 133.

The client device 106 then downloads a file 136 from a file server 109 through the management service 119. The client device 106 may provide a username and password, or other authentication credentials, to the management service 119. Subsequently, the client device 106 requests file 136 from the management service 119. The management service 119 confirms that the file 136 may be accessed by the client device 106 based upon the supplied authentication credentials and/or other criteria. The management service 119 may then provide a link to the file 136 in the file data store 149 for the client device 106 to use to retrieve the 136. The link may correspond to a uniform resource locator (URL) or similar addressing schema. In various embodiments, the management service 119 may retrieve the requested file 136 front the file data store 149 and relay the file 136 to the client device 106. In such embodiments, the management service 119 may function in a manner comparable to a proxy server or similar application.

After retrieving and storing the file 136 in the client data store 129, the client indexer application 143 indexes the content of the file 136. The client indexer application 143 may parse the file 136 to identify individual words within the file 136, permitting the contents of the file 136 to be word searched. The index data generated for the content of the file 136 is then stored in the client index 133 for local searching of the file 136 by various applications executing on the client device 106. In some embodiments, the client indexer application 143 may index the contents of the file 136 every time the file 136 is retrieved and/or accessed by the client device 106, only the first time that the file 136 is retrieved and/or accessed by the client device 106, only when the file 136 is modified by the client device 106, and/or a combination of one r of the previously described conditions. In such embodiments, the client indexer application 143 may determine whether one or more of these conditions has occurred by querying the master index 126 or the client index 133 to determine when the file 136 was last accessed, last indexed, and/or last modified based at least in part upon the metadata for the file 136 stored in the master index 126 and/or the client index 133.

The client indexer application 143 may also send or otherwise upload the index data generated for the file 136 to the index aggregator service 123. This allows the index aggregator service 123 to add the indexed contents of the file 136 to the search index 127 to assist other client devices 106 in their search of flies 136 or for files 136. However, in some embodiments, the client indexer application 143 may directly update the search index 127 to include or otherwise incorporate the indexed contents of the file 136. In addition, the client indexer application 143 may also update the master index 126, as appropriate, to reflect the latest access time of the file 136 by the client device 106.

The index aggregator service 123 may also track which files 136 have been downloaded by client devices 106. If the index aggregator service 123 determines that a file 136 has not been downloaded by a client device 106, which may result in the content of the file 136 remaining unindexed indefinitely, the index aggregator service 123 may send a request to one or more client devices 106 to index the file 136. The index aggregator service 123 may also send a request to one or more client devices 106 to index the file 136 in response to detecting that the file has changed or otherwise been modified, if a first client device 106 refuses to index the contents of the file 136, as may be further described herein, or fails to index the contents of the file 136, the index aggregator service 123 may iterate through multiple client devices 106 until a client device 106 responds that it will index the contents of the file 136 and/or provides the indexed contents of the file 136 to the index aggregator service 123 or updates the search index 127 with the indexed contents of the file 136.

Figure 2:
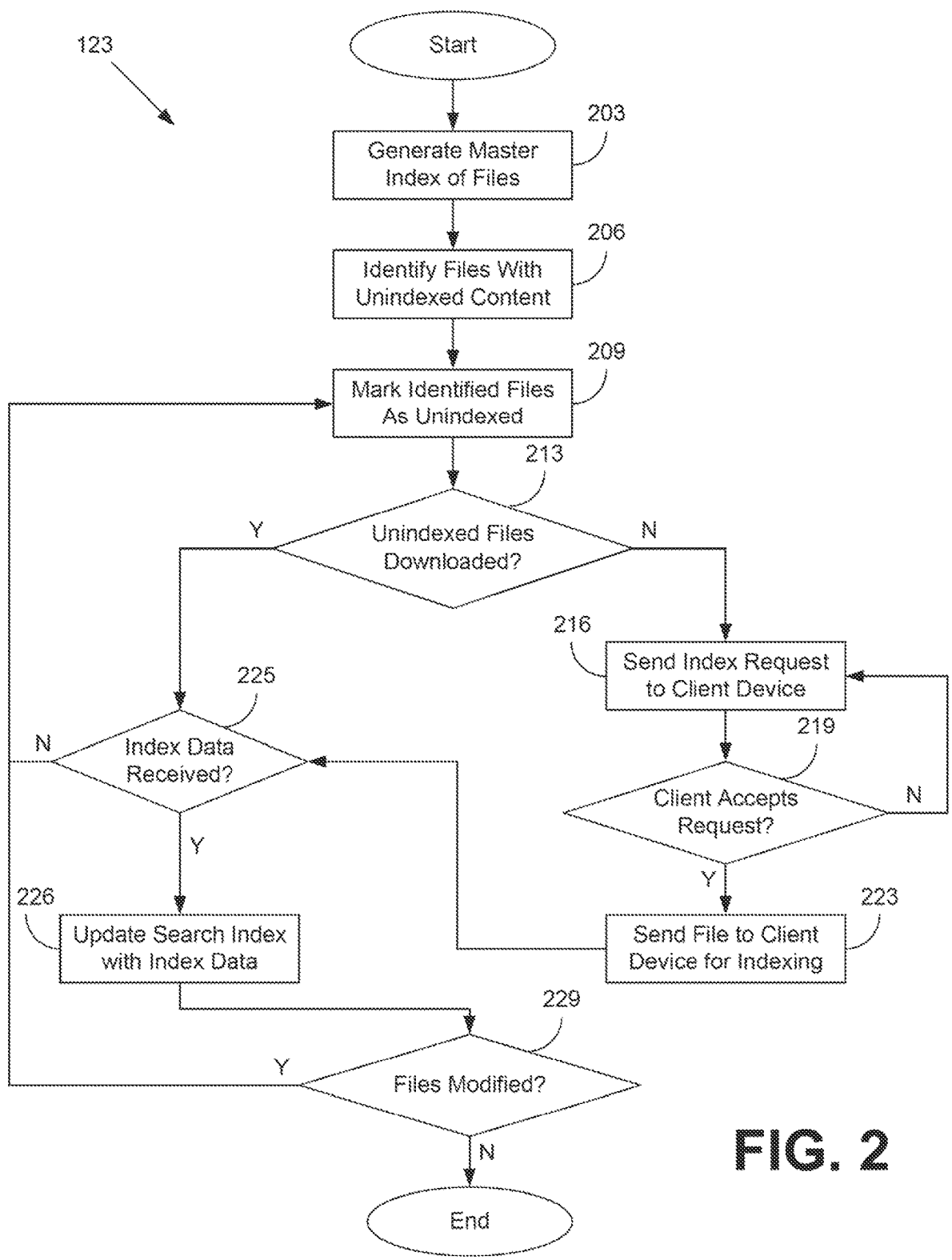
FIG. 2 is a flowchart illustrating one example of functionality implemented as portions of the index aggregator service executed in a computing environment in the networked environment of FIG. 1 according to various embodiments of the present disclosure.

Referring, next to FIG. 2, shown is a flowchart that provides one example of the operation of a portion of the index aggregator service 123 according to various embodiments. It is understood that the flowchart of FIG. 2 provides merely an example of the many different types of functional arrangements that may be employed to implement the operation of the portion of the index aggregator service 123 as described herein. As an alternative, the flowchart of FIG. 2 may be viewed as depicting an example of elements of a method implemented in the computing environment 103 (FIG. 1) according to one or more embodiments.

Beginning with box 203, the index aggregator service 123 generates an initial version of a master index 126 (FIG. 1B) for files 136 (FIG. 1B) stored in file data stores 149 (FIG. 1B) accessible to client devices 106 (FIG. 1B) through a management service 119 FIG. 1B). The index aggregator service 123 may send a query to the file service 146 (FIG. 1B) corresponding to each file data store 149 to obtain a list of files 136 and file metadata for each file 136 served by the respective file service 146. The index aggregator service 123 may then create an entry, listing, or similar record in the master index 126, for each file 136 identified in response to the query and store the corresponding metadata for each file 136 in the master index 126 in association with each file 136. This may permit client devices 106 to search for individual files 136 using file 136 metadata, such as the name of the file 136, the creator of the file 136, and/or similar metadata for the file 136.

Proceeding next to box 206, the index aggregator service 123 identifies files 136 with unindexed content. After the creation of the master index 126, this may correspond to identifying all files 136 included in the master index 126 as having unindexed content. However, in some embodiments, at least some of the files 136 may have had their content previously indexed, such as in embodiments where the file content is included in the metadata of the file 136.

Referring next to box 209, the index aggregator service 123 marks each file 136 that has been identified as having content that has not been indexed as being an unindexed file 136. In various embodiments, this may involve setting a Boolean flag, bit, or similar variable associated with the record of the file 136 in the master index 126 to a value that represents an unindexed state. In various embodiments, this may involve adding or removing records of files 136 from a list, queue, tree, or similar searchable data structure, where the presence or absence of the record of the file 136 represents whether the content of the file 136 has been indexed.

Moving on to box 213, the index aggregator service 123 determines whether each file 136 that has not had its content indexed has been downloaded by a client device 106 within a previously defined time window which may be configured as appropriate. If a file 136 with unindexed content has been downloaded within the previously defined time window, this may indicate that a client device 106 will likely be uploading index data for the content of the file 136 at some point in the future. Accordingly, the index aggregator service 123 will wait to receive the index data for the content of the file 136 and, therefore, execution proceeds to box 225. However, if the file 136 with unindexed content has not been downloaded by a client device 106 within the previously defined time window, this may indicate that the content of the file 136 will remain unindexed by a client device 106, possibly because the file 136 is unknown to users. Therefore, in order to cause the content of the file to be indexed by at least one client device 106, execution proceeds to box 216.

Proceeding net to box 216, the index aggregator service 123 sends a request to a client device 106 in data communication with the management service 119 for the client device 106 to index a file 136. The request may pit file 136 to be indexed and where the file 136 is located. The request may include the name of the file 136 and a link to the file 136 from which the file 136 may be downloaded.

Referring next to box 219, the index aggregator service 123 determines whether the client device 106 has accepted the request. The client device 106 may reject the request for any one or more of a number of reasons. Such reasons may include that the client device 106 or user of the client device 106 is not authorized to have access to the file 136, that the client device 106 lacks sufficient resources to index the content of the file 136 (e.g. insufficient battery charge, too little memory, etc.), or that the work queue 139 (FIG. 2) of the client device 106 is full, indicating that the client device 106 has already responsible for indexing the content of a number of files 136. If the client device 106 rejects the request or, in some embodiments, fails to respond to the request, then execution loops back to box 216 and the index aggregator service 123 selects another client device 106 for indexing the content of the file 136. Otherwise, execution proceeds to box 223.

Moving on to box 223, the index aggregator service 123 sends or otherwise provides the file 136 to the client device 106 for the content of the file 136 to be indexed. In some embodiments, the index aggregator service 123 may directly send the file 136 to the client device 106. In other embodiments, the index aggregator service 123 may provide the client device 106 with the necessary information for the client device 106 to retrieve the file 136. The index aggregator service 123 may provide the client device 106 with a uniform resource locator (URL) or similar address which the client device 106 may use to retrieve the file 136.

Proceeding next to box 225, the index aggregator service 123 determines whether the index data for the file 136 has been received from the client device 106 previously identified or selected as being responsible for indexing the content of the file 136. The index aggregator service 123 may, in various embodiments, wait for a predefined or predetermined period of time (i.e. a "time-out window") to receive the index data from the client device 106. In one embodiment, the time-out window may be defined by a configuration setting by a system administrator. In another embodiment, the time-out window may be automatically determined and/or adaptively adjusted based on, e.g., the size of the file, historical indexing times, etc. If the index data for the content of the file 136 is not received within the predefined or predetermined period of time, this may indicate that the client device 106 has failed to index the content of the file 136 or is unable to index the content of the file 136. The client device 106 may have lost power, been stolen, been reformatted, have lost network connectivity, or have experienced some other malfunction. Therefore, the index aggregator service 123 may loop back to box 209 to restart the process of Obtaining index data for the content of the file 136. If the index data for the content of the file 136 is received, from the client device 106 within the predefined or predetermined period of time, then execution proceeds to box 226.

Referring next to box 226, the index aggregator service 123 updates the search index 127 to include the index data of the content of the file 136. The index aggregator service 123 may update a record in the search index 127 by issuing one or more commands to the indexer data store 116 to associate the index data of the content of the file 136 with the record or records in the search index 127 for the file 136. This may allow other client devices 106 to search the content of the file 136 by querying the search index 127.

Moving on to box 229, the index aggregator service 123 checks to see if the file 136 has been modified. In various embodiments, the index aggregator service 123 may query the file service 146 responsible for serving the file 136 from the file data store 149 to see if the timestamp, datestamp, or similar record reflecting the time that the file 136 was last modified has changed since the content of the file 136 was indexed. In various embodiments, the index aggregator service 123 may determine whether a current digital signature for the content of the file 136 has changed in comparison to a previous digital signature of the content of the file 136. A change in the value of the digital signature, such as a difference in the hash value produced by a function such as the Message Digest 5 MD5) function or various versions of the Secure Hash Algorithm (SHA), would indicate a change in the content of the file 136. If the index aggregator service 123 determines that the file 136 has been subsequently modified since the content of the file 136 was indexed, then execution loops back to box 209 and the index aggregator service 123 arranges for the content of the file 136 to be indexed again. Otherwise, the previously described path of execution of the index aggregator service 123 subsequently ends.

Figure 3:
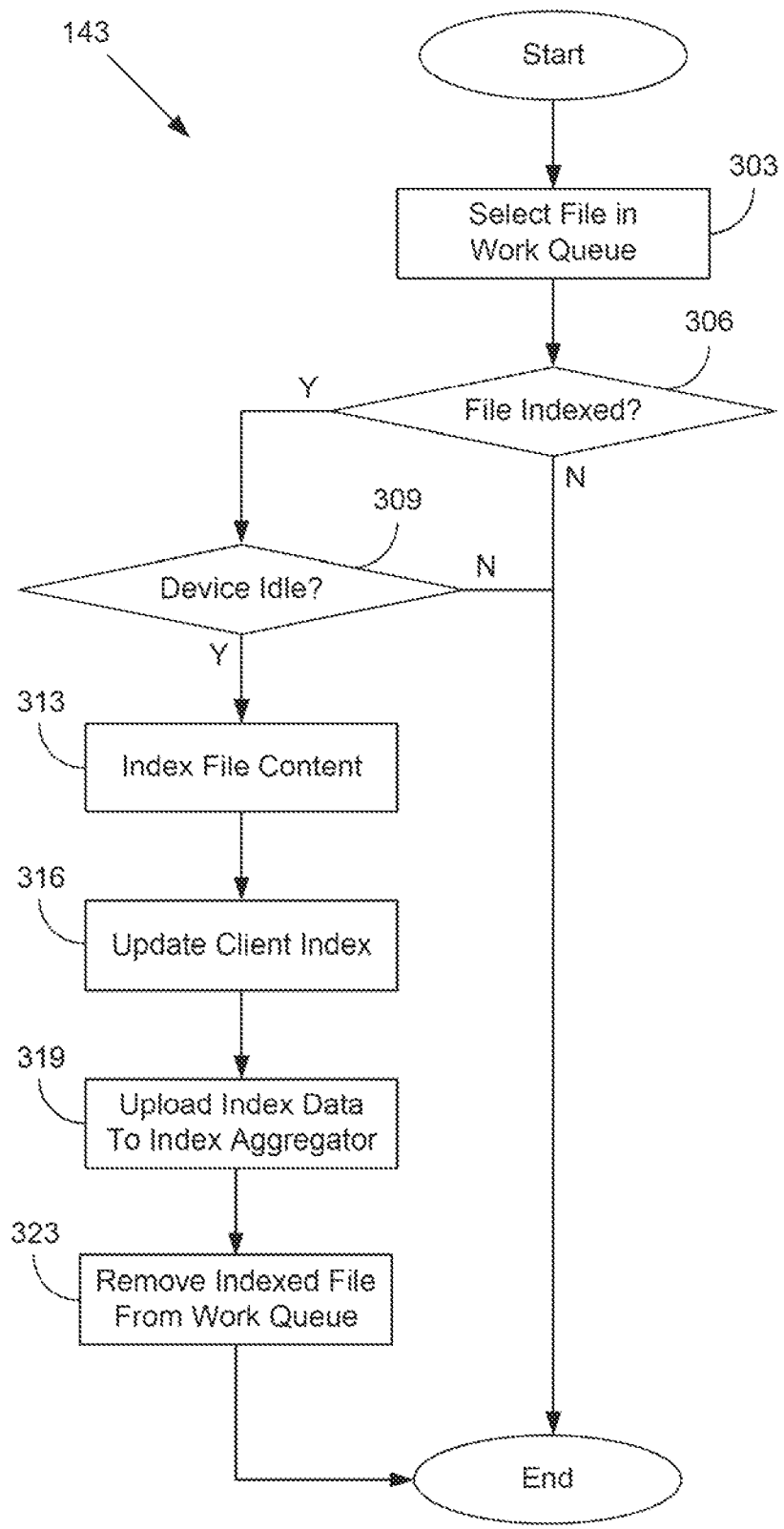
FIG. 3 is a flowchart illustrating one example of functionality implemented as portions of client indexer application executed in a client device in the networked environment of FIG. 1 according to various embodiments of the present disclosure.

Referring next to FIG. 3, shown is a flowchart that provides one example of the operation of a portion of the client indexer application 143 according to various embodiments. It is understood that the flowchart of FIG. 3 provides merely an example of the many different types of functional arrangements that may be employed to implement the operation of the portion of the client indexer application 143 as described herein. As an alternative, the flowchart of FIG. 3 may be viewed as depicting an example of elements of a method implemented in the computing environment 103 (FIG. 1) according to one or more embodiments.

Beginning with box 303, the client indexer application 143 selects at the 136 (FIG. 1) in the work queue 139 (FIG. 1) for indexing. The file 136 may have been previously placed in the work queue 139, in response to receiving a request from the index aggregator service 123 (FIG. 1) to specifically download the file 136 for indexing. The file 136 may also have been added to the work queue 139 in response to the file 136 being downloaded for the first time by a client device 106, as previously determined by a query of the master index 126 when the client device 106 searched for and/or retrieved the file 136.

Proceeding next to box 306, the client indexer application 14 determines whether or not the file 136 has already been indexed poor to beginning to index, the contents of the file 136. The client indexer application 143 may send a query of the master index 126 (FIG. 1) to the index aggregator service 123 (FIG. 1) to determine whether another instance of the client indexer application 143 executing on another client device 106 has already indexed the content of the file 136 between the time that the client device 106 retrieved the file 136 and began the process of indexing the content of the file 136. If a record for the file 136 in the master index 126 indicates that the content of the file 136 has already been indexed, then the previously described path of execution of the client indexer application 143 ends. However, if the record for the file 136 in the master index 126 indicates that the content of the file 136 remains unindexed, then execution of the client indexer application 143 proceeds to box 309.

Moving on to box 309, the client indexer application 143 determines whether the client device 106 is currently idle. A client device 106 may be considered to be idle if as system idle process, or similar process, is consuming more than a predefined threshold percentage or portion of the computing resources of the client device 106. This determination may be made to ensure that enough resources of the client device 106 are available for indexing. Indexing the content of the file 136 may, in some instances and/or embodiments, require enough resources of the client device 106 that other applications on the client device 106 might be impacted. If an internet browser application is executing on the client device 106, indexing the content of the file 136 concurrently with the execution of the interact browser may cause the internet browser application to appear slow, laggy, or otherwise impact the usability of the internet browser application if insufficient resources are available for both the internet browser application and the client indexer application 143 to run simultaneously. If the client device 106 is not idle when the client indexer application 143 attempts to begin indexing, the content of the file 136, then the previously described path of execution of the client indexer application 143 ends. However, if the client device 106 is idle, then execution proceeds to box 313.

Referring next to box 313, the client indexer application 143 indexes the content of the file 136. The client indexer application 143 may parse text in the file 136 to generate a list of words that appear in the file 136. As another example, the client indexer application 143 may perform image analysis to identify regions of an image or images in the file 136 for use with image searching or image matching. Other types of files 136 may be appropriately indexed.

Proceeding next to box 316, the client indexer application 143 updates the local client index 133 with the index data of the file 136 that was generated at box 313. This allows locally executing applications on the client device 106 to search the content of the file 136 immediately after it is indexed in those embodiments that implement this functionality.

Moving on to box 319, the client indexer application 143 sends, transmits, or otherwise uploads the index data for the content of the file 136 to the index aggregator service 123. In various embodiments, such as those embodiments where the client index 133 is a locally stored mirror of the master index 126 and/or search index 127 (FIG. 1) the client indexer application 143 may upload a changeset reflecting the differences between the updated client index 133 and the previous version of the client index 133, to the index aggregator service 123, which then updates the master index 126 and/or search index 127. In some embodiments, the client indexer application 143 may send the index, data for the content of the file 136 and an identifier for the file 136 to the index aggregator service 123, which then updates the master index 126 and/or search index 127. In some embodiments, the client indexer application 143 may directly update the master index 126 and/or search index 127, such as by issuing one or ore database commands that cause the master index 126 and/or search index 127 to be updated to associate the index data for the content of the file 136 with the record or records in the master index 126 and/or search index 127 that correspond to the file 136.

Referring next to box 323, the client indexer application 143 removes the file 136 from the work queue 139. This reflects to the client indexer application 143 that the file 136 has been successfully indexed. The previously described path of execution of the client indexer application 143 subsequently ends.

The flowcharts of FIGS. 2 and 3 show examples of the functionality and operation of implementations of components described herein. The components described herein can be embodied in hardware, software, or a combination of hardware and software. If embodied in software, each element may represent a module of code or a portion of code that comprises program instructions to implement the specified logical function(s). The program instructions may be embodied in the form of source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts of FIGS. 2 and 3 show a specific order of execution, it is understood that the order of execution may differ from that which is shown. The order of execution of two or more elements may be switched relative to the order shown. Also, two or more elements shown in succession may be executed concurrently or with partial concurrence. Further, in some embodiments, one or more of the elements shown in the flowcharts may be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The computing environment 103, client device 106, the file server 109, and/or other components described herein may each include at least one processing circuit. Such a processing circuit may comprise one or more processors and one or more storage devices that are coupled to a local interface. The local interface may comprise a data bus with an accompanying address/control bus or any other suitable bus structure.

The one or more storage devices for a processing circuit may store data and/or components that are executable by the one or processors of the processing circuit. The management service 119, index aggregator service 123, the client indexer application 143, and/or other components may be stored in one or more storage devices and be executable by one or more processors. Also, a data store, such as the indexer data store 116, the client data store 129, and the file data store 149, may be stored in the one or more storage devices.

The management service 119, index aggregator service 123, the client indexer application 143, and other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology may include one or more microprocessors, discrete logic circuits having logic gates for implementing various logic functions upon an application of one or more data signals, application specific integrated circuits (ASICs) having appropriate gates, programmable logic devices (e.g., field-programmable gate array (FPGAs) and complex programmable logic devices (CPLDs)), etc.

Also, one or more or more of the components described herein that comprises software or program instructions can be embodied in any non-transitory computer-readable medium for use by or in connection with an instruction execution system such as a processor in a computer system or other system. Such a computer-readable medium may contain, store, and/or maintain the software or program instructions for use by or in connection with the instruction execution system.

The computer-readable medium can comprise a physical media, such as, magnetic, optical, semiconductor, and/or other suitable media. Examples of a suitable computer-readable media include, but are not limited to, solid-state drives magnetic drives, flash memory, etc. Further, any logic or component described herein may be implemented and structured in a variety of ways. One or more components described may be implemented as modules or components of a single application. Further, one or more components described herein may be executed in one computing device or by using multiple computing devices. Additionally, it is understood that terms, such as "application," "service," "system," "engine," "module," and so on, may be interchangeable and are not intended to be limiting unless indicated otherwise.

It is emphasized that the above-described embodiments of the present disclosure are merely examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principle of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an index service executable in a computing device, wherein the index service is configured to cause the computing device to at least:

identify a plurality of file services registered in association with a user account;

transmit, by the index service, a plurality of file queries to the plurality of file services, a respective file service providing a list of files based on a respective query, wherein the plurality of file services are separate from a computing environment of the index service;

generate an initial version of a master index based on the list of files received from the respective file service, the master index comprising a plurality of records corresponding to the list of files, wherein the respective file service is separate from the computing environment of the index service;

authenticate access to a file by a client device;

send, from the index service to the client device, a request for the client device to index the file, the request comprising a uniform resource locator (URL) for the client device to retrieve the file from a particular file service;

receive, from a client application executed by the client device, an indication that the request to index the file is accepted;

determine that the client device has failed to index the file before a threshold period of time has lapsed;

send a request to a second client device, wherein the request comprises a request for the second client device to index the file;

receive index data of the file from the second client device, the index data having been generated by the second client device and the index data representing indexed content of the file; and update the master index based at least in part on the index data of the file.

2. The non-transitory computer-readable medium of claim 1, wherein the index service is further configured to cause the computing device to at least:

create a record for the file in the master index based on the list of files obtained from the respective file service, wherein the record of the file includes a file name, and wherein updating the master index comprises including the index data in the record for the file.

3. The non-transitory computer-readable medium of claim 1, wherein the URL of the file comprises a link to the file.

4. The non-transitory computer-readable medium of claim 1, wherein the index service is further configured to cause the computing device to at least:

push the file to the second client device in response to the determination that the first client device has failed to index the file before the threshold period of time has lapsed.

5. The non-transitory computer-readable medium of claim 1, wherein the client device is one of a plurality of client devices and the index service is further configured to cause the computing device to at least:

determine a number of the plurality of client devices that have retrieved the file; and instruct a subset of the plurality of client devices to index the file in response to a determination that the number of the plurality of client devices exceeds a threshold.

6. The non-transitory computer-readable medium of claim 1, wherein the master index comprises indexed metadata for the file and the index data comprises an index of content data of the file.

7. The non-transitory computer-readable medium of claim 1, wherein the index service is further configured to cause the computing device to at least send a copy of at least a portion of the master index to the client device in response to a request from the client device for the copy.

8. A method comprising:

identifying, by an index service executed by a computing device, a plurality of file services registered in association with a user account;

transmitting, by the index service executed by the computing device, a plurality of file queries to the plurality of file services, a respective file service providing a list of files based on a respective query, wherein the plurality of file services are separate from a computing environment of the index service;

generating, by the index service executed by the computing device, an initial version of a master index based on the list of files received from the respective file service, the master index comprising a plurality of records corresponding to the list of files, wherein the respective file service is separate from the computing environment of the index service;

sending, from the index service to a client device, a request for the client device to index a file, the request comprising a uniform resource locator (URL) for the client device to retrieve the file from a particular file service;

receiving, from a client application executed by the client device, an indication that the request to index the file is accepted;

determining that the client device has failed to index the file before a threshold period of time has lapsed;

pushing the file to a second client device in response to the determination that the client device has failed to index the file before the threshold period of time has lapsed;

instructing the second client device to index the file;

receiving, by the index service executed by the computing device, index data of the file from the second client device, the index data having been generated by the second client device and the index data representing indexed content of the file; and updating, by the index service executed by the computing device, the master index with the index data of the file.

9. The method of claim 8, further comprising creating a record for the file in the master index based on the list of files obtained from the respective file service, wherein the record of the file includes a file name, and wherein updating the master index comprises including the index data in the record for the file.

10. The method of claim 8, further comprising:
receiving, by the computing device, metadata of the file from the respective file service; and
updating, by the computing device, the master index with the metadata of the file.

11. The method of claim 8, wherein the index data of the file comprises an index of content data of the file.

12. The method of claim 8, further comprising:
querying, by the index service, the particular file service for a file modification timestamp; and
determining, by the index service, that the file modification timestamp indicates a time subsequent to a time the file was indexed, wherein the request for the client device to index the file is sent to the client device based on the file being modified.

13. The method of claim 8, further comprising:
identifying, by the index service, a change in a digital signature associated with the file, wherein the request for the client device to index the file is sent to the client device based on the change in the digital signature.

14. The method of claim 8, wherein the URL of the file comprises a link to the file.

15. A method, comprising:
identifying, by an index service, a plurality of file services registered in association with a user account;
transmitting, by the index service, a plurality of file queries to the plurality of file services, a respective file service providing a list of files based on a respective query, wherein the plurality of file services are separate from a computing environment of the index service;

accessing, by a client device, an initial version of a master index of the index service, the initial version of the master index being generated by the index service based on the list of files from the respective file service, the master index comprising a plurality of records corresponding to the list of files, wherein the respective file service is separate from the index service;

receiving, by the client device, a request for the client device to index a file, the request being received from the index service, the request comprising a uniform resource locator (URL) for the client device to retrieve the file from a particular file service;

transmitting, to the index service, an indication that the request to index the file is accepted;

downloading, by the client device, the file using the URL provided by the index service;

determining that the client device has failed to index the file before a threshold period of time has lapsed;

sending a request to a second client device, wherein the request comprises a request for the second client device to retrieve the file and index the file;

indexing, by the second client device, the file to generate index data, the index data representing indexed content of the file; and uploading, by the second client device, the index data to the index service.

16. The method of claim 15, further comprising:
downloading, by the second client device, a copy of the master index from the index service; and
updating, by the second client device, a local index based at least in part on the copy of the master index.

17. The method of claim 16, further comprising updating, by the client device, the local index based at least in part on the index data of the content of the file.

18. The method of claim 16, wherein downloading, by the client device, the file occurs in response to the client device receiving the request for the client device to index the file.

19. The method of claim 15, further comprising:
determining, by the second client device, that the second client device has entered an idle state based on the system idle process indicating availability of the threshold portion of the computing resources of the second client device; and
wherein the indexing of the file by the second client device occurs once the second client device has entered the idle state.

20. The method of claim 15, further comprising:
identifying, by the index service, that the file is unindexed; and
determining, by the index service, that the file is undownloaded by at least one client device, wherein the index service transmits the request for the client device to index the file based on the file being undownloaded by the at least one client device.

* * * * *